(12) United States Patent
Turban et al.

(10) Patent No.: US 8,838,327 B2
(45) Date of Patent: Sep. 16, 2014

(54) METHOD FOR ANALYZING FAULTS PRESENT ON A PLATFORM AND ASSOCIATED SYSTEM

(75) Inventors: Laurent Turban, Bougival (FR); Walter Turco, Chambourcy (FR)

(73) Assignee: Dassault Aviation, Paris (FR)

( * ) Notice: Subject to any disclaimer, the term of this patent is extended or adjusted under 35 U.S.C. 154(b) by 155 days.

(21) Appl. No.: 13/440,050

(22) Filed: Apr. 5, 2012

(65) Prior Publication Data

US 2012/0259505 A1 Oct. 11, 2012

(30) Foreign Application Priority Data

Apr. 6, 2011 (FR) ...................................... 11 01038

(51) Int. Cl.
*G01M 17/00* (2006.01)
*G06F 11/07* (2006.01)
*G05B 23/02* (2006.01)

(52) U.S. Cl.
CPC .......... *G06F 11/079* (2013.01); *G06F 11/0739* (2013.01); *G05B 23/0278* (2013.01)
USPC ................ 701/31.8; 701/3; 701/13; 340/945; 340/963

(58) Field of Classification Search
CPC .............. G06F 11/079; G06F 11/0739; G05B 23/0278
USPC ................ 701/3, 13, 14, 15, 29.3, 31.8, 32.9; 340/945, 963
See application file for complete search history.

(56) References Cited

U.S. PATENT DOCUMENTS

| | | | | |
|---|---|---|---|---|
| 5,453,939 A | * | 9/1995 | Hoffman et al. | 702/183 |
| 5,596,712 A | * | 1/1997 | Tsuyama et al. | 714/26 |
| 7,130,768 B2 | * | 10/2006 | Hofmeister et al. | 702/183 |
| 2003/0195675 A1 | * | 10/2003 | Felke et al. | 701/29 |
| 2007/0226540 A1 | | 9/2007 | Konieczny | |
| 2009/0024356 A1 | | 1/2009 | Platt et al. | |
| 2011/0137711 A1 | * | 6/2011 | Singh et al. | 705/7.38 |

FOREIGN PATENT DOCUMENTS

EP 1236986 A2 9/2002
WO 2009097435 A1 8/2009

OTHER PUBLICATIONS

French Search Report, dated Nov. 25, 2011, from corresponding French application No. FR1101038.

* cited by examiner

*Primary Examiner* — Gertrude Arthur Jeanglaude
(74) *Attorney, Agent, or Firm* — Young & Thompson

(57) ABSTRACT

A method for analyzing faults present on a platform includes the following steps:
(a) providing a table of correspondence between a plurality of observable symptoms on the platform (10) and the fault modes capable of creating each observable symptom;
(b) measuring the observable symptoms present on the platform (10);
(c) establishing at least one family of faults, including determining a list of fault modes capable of creating, alone or in combination, all of the selected present symptoms, placing each given fault mode of the group in a fault family, and grouping all of the fault modes capable of creating at least one selected present symptom shared with the given fault mode together in the same fault family as the given fault mode. The method is applicable to fault analyses on aircrafts.

19 Claims, 10 Drawing Sheets

| S1 | ▭ | V | P |
|----|---|---|---|
| S2 | ∅ | NV ||
| S3 | ▭ | V | P |
| S4 | ∅ | NV ||
| S5 | ∅ | NV ||
| S6 | ∅ | NV ||
| S7 | ▭ | V | P |

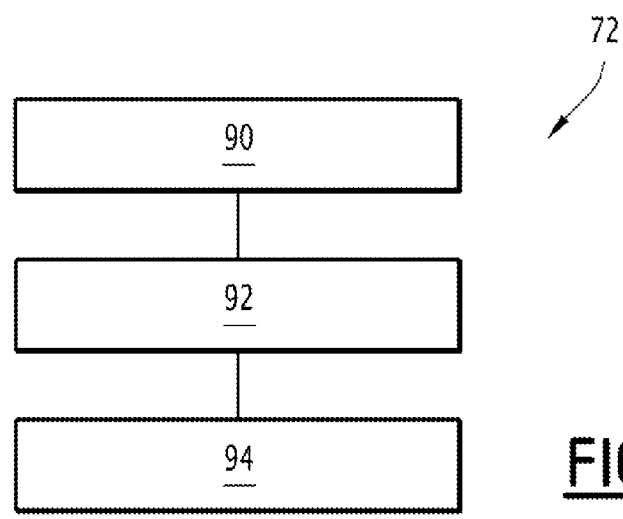
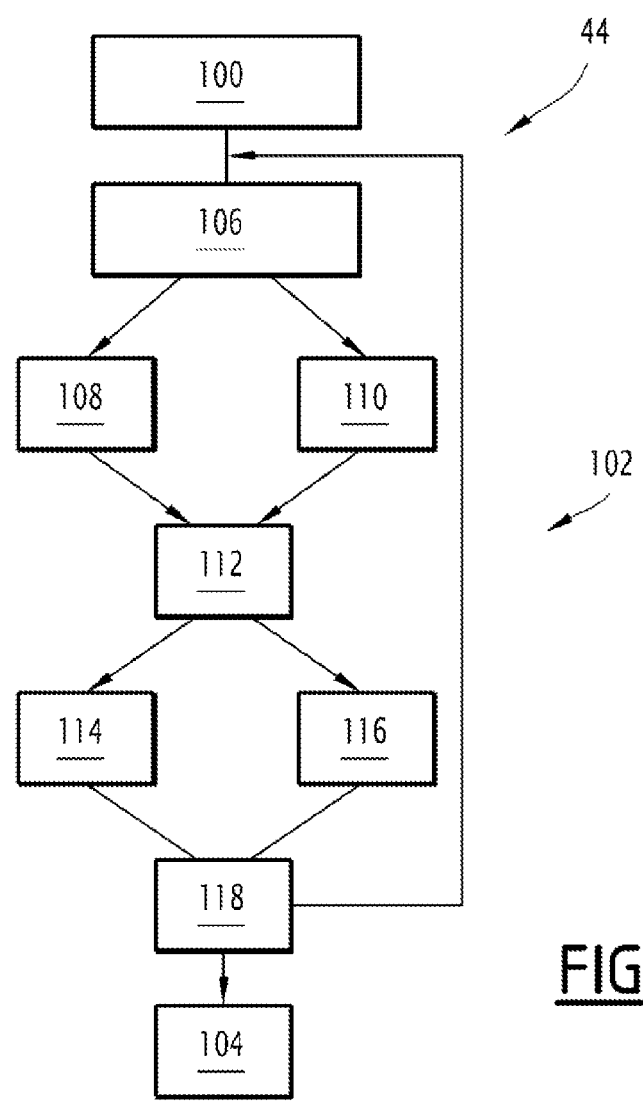
FIG.5
FIG.6

| Fault mode | Global likelihood (per hour of flight) |
|---|---|
| MD1 | 0,02 |
| MD2 | 0 |
| MD3 | 0,02 |
| MD4 | 0 |
| MD5 | 0,1 |
| MD6 | 0 |
| MD7 | 0,1 |
| MD8 | 0 |
| MD9 | 0 |
| MD10 | 0 |
| MD11 | 0 |
| MD12 | 0,32 |

|     | S1 | S2 | S3 | S4 | S5 | S6 | S7 |
| --- | --- | --- | --- | --- | --- | --- | --- |
| MD1 | X(100) | | | | | | |
| MD2 | | X(100) | | | | | |
| MD3 | | | X(100) | | | | |
| MD4 | | | | X(100) | | | |
| MD5 | X(100) | | | | | | |
| MD6 | | X(100) | | | | | |
| MD7 | | | X(100) | | | | |
| MD8 | | | | X(100) | | | |
| MD9 | | | | | X(100) | | |
| MD10 | | | | | | X(100) | |
| MD11 | | X(33) | | X(34) | | X(33) | |
| MD12 | O(14) | O(15) | O(14) | O(14) | O(15) | O(14) | X(14) |

FIG.9

METHOD FOR ANALYZING FAULTS PRESENT ON A PLATFORM AND ASSOCIATED SYSTEM

BACKGROUND OF THE INVENTION

The present invention relates to a method for analyzing at least one fault present on a platform.

The platform is advantageously an aircraft, such as a civil or military airplane. A platform of this type has a large number of distinct mechanical, electric, and electronic operating systems. These systems are often interconnected.

Such systems can therefore create a multitude of distinct faults that result in a plurality of observable symptoms on the platform.

The observable symptoms are for example fault codes, which in particular identify self-test results, electrical system integrity test results, or sensor and actuator test results. Other data, such as the status of the aircraft, or the position of a valve, can be measured and taken into account as symptoms to identify the detailed configuration of the aircraft in the context of the event creating the observed symptoms.

In certain cases, the number and variety of observed symptoms makes it extremely complex to determine the faulty system(s) capable of creating the symptoms.

Subsequently, the maintenance procedures to be performed on the device may be very complicated and require considerable analysis time.

To partially offset this problem, it is known to associate a set of symptoms with a plurality of equations that determine, as a function of the captured symptoms signature, whether that signature corresponds to a theoretical signature of a defined fault, based on equations.

Equation analysis methods are limited as to their ease of use and the relevance of the results obtained. In fact, once the captured signature does not correspond to the theoretical signature, it is difficult to determine the origin of the fault. The equations defining the signature are also complex by nature, inasmuch as the functional system has a complicated structure.

This type of method is therefore not fully satisfactory, since these methods sometimes lead to replacing equipment assumed to be faulty, and which, once replaced, does not resolve the fault. In certain cases, a large quantity of suspect equipment must be replaced to resolve the fault.

All of these hard-to-resolve faults lead to unwanted immobilizations of the aircraft, or interventions by the builder.

One aim of the invention is therefore to establish an analysis method that makes it possible to determine, globally and quickly, the origin of complex faults present on an aircraft, without using complex mathematical models.

BRIEF SUMMARY OF THE INVENTION

To that end, the invention relates to a method of the aforementioned type, comprising the following steps:

(a) providing a table of correspondence between a plurality of observable symptoms on the platform and the fault modes capable of creating each observable symptom;

(b) measuring the symptoms present on the platform and selecting at least part of the measured present symptoms;

(c) establishing at least one family of faults, the establishment step comprising the following phases:

obtaining, from the table of correspondence, a list of fault modes capable of creating, alone or in combination, all of the selected symptoms that are present; and, for each given fault mode of said list:

placing a given fault mode in a fault family;

grouping together, within the same fault family as the given fault mode, all of the fault modes of said list capable of creating at least one selected present symptom in common with the given fault mode.

The method according to the invention can comprise one or more of the following features, considered alone or according to any technically possible combinations:

the grouping phase comprises checking off each selected present symptom capable of being created by the given fault mode and placing, in said fault family, all of the fault modes from said list capable of being created by each checked symptom.

step (c) creates a single fault family, the single fault family comprising at least one fault mode, the or each fault mode of the fault family being capable of creating each present symptom selected in step (b).

step (c) creates a plurality of separate fault families, each fault mode of the first fault family not having any selected present symptoms in common with each fault mode of a second fault family.

step (c) comprises the following phases:

(c1) scanning each fault mode listed in the list of fault modes to determine whether the scanned fault mode already belongs to a fault family;

(c2) if the scanned fault mode does not already belong to a fault family, creating a new fault family comprising the scanned fault mode;

(c3) scanning all of the selected present symptoms capable of being created by the scanned fault mode of the new fault family;

(c4) checking off, based on the table of correspondence, other fault modes capable of creating said selected present symptoms;

(c5) determining, for each other checked fault mode, whether that fault mode belongs to another fault family.

in step (c5), if the fault mode belongs to another fault family, the method includes merging the other fault family with the newly-created fault family, and if not, the method comprises integrating the checked fault mode into the existing family.

it comprises, between step (b) and step (c), separating the fault modes capable of creating each selected present symptom into a first group of potentially active fault modes and a second group of potentially inactive fault modes, the list of fault modes determined in step (c) including only the potentially active fault modes.

the table of correspondence includes, for each fault mode, the assignment to each symptom associated with that fault mode of a deterministic criterion of the symptom, to distribute the symptoms of that fault mode between at least a first group of systematic symptoms and potentially at least one second group of non-systematic symptoms, the separating step comprising the classification, in the second group of potentially inactive fault modes, of each fault mode not including all of the systematic symptoms from among the list of present symptoms measured in step (b).

it comprises a step for calculating the overall likelihood of each fault mode associated with at least one present symptom selected in step (b), based on a predetermined representative value of the occurrence of the appearance of the fault mode and a vector representative of the number of present symptoms selected in step (b) among the symptoms associated with fault mode in the table of correspondence.

it comprises, for each fault family, a step for determining the or each subset of minimum fault modes capable of creating, by themselves, all of the selected present symptoms in the fault family.

the determination step includes the following sub-steps:

creating a plurality of initial subsets, each subset containing at least one fault mode associated with a selected present symptom of the family;

iterative intersection of the initial subsets to determine the fault modes shared between the subsets;

eliminating the redundant subsets present in the shared fault modes.

It comprises, for each subset, the calculation of a probability of the occurrence of each of the fault modes present in the subset as a function of a predetermined occurrence value of each fault mode.

It comprises a first phase for establishing at least one fault family, based on a first set of present symptoms selected in step (b) and from the table of correspondence; then a second phase for establishing at least one second fault family based on the table of correspondence and a second set of selected present symptoms including some of the symptoms from the first set of selected present symptoms, the second set of present symptoms being distinct from the first set of selected present symptoms.

It comprises carrying out a maintenance step on the platform based on the or each fault family obtained in step (c).

The invention also relates to a fault analysis system comprising:

means for storing a table of correspondence between a plurality of observable symptoms on the platform and the fault modes capable of creating each observable symptoms;

means for measuring the observable symptoms present on the platform and selecting at least some of the measured present symptoms;

means for establishing at least one fault family, the establishment means comprising:

means for obtaining, from the table of correspondence, a list of fault modes capable of creating, alone or in combination, all of the selected present symptoms;

means for placing each given fault mode of said list in a fault family;

means for grouping together, in the same fault family as the given fault, all of the fault modes from the list capable of creating at least one selected present symptom shared with the given fault mode.

BRIEF DESCRIPTION OF THE SEVERAL VIEWS OF THE DRAWINGS

The invention will be better understood upon reading the following description, provided solely as an example, and done in reference to the appended drawings, in which:

FIG. 5 is an overview diagram similar to that of FIG. 3 showing the different phases of the step for determining the overall likelihood of fault modes;

FIG. 6 is a view similar to FIG. 2 showing the different phases of the step for determining the fault families;

FIG. 9 illustrates a table of correspondence between a plurality of symptoms and the fault modes capable of creating those symptoms for the implementation of the step for determining the fault families;

DETAILED DESCRIPTION OF THE INVENTION

Figure 1:
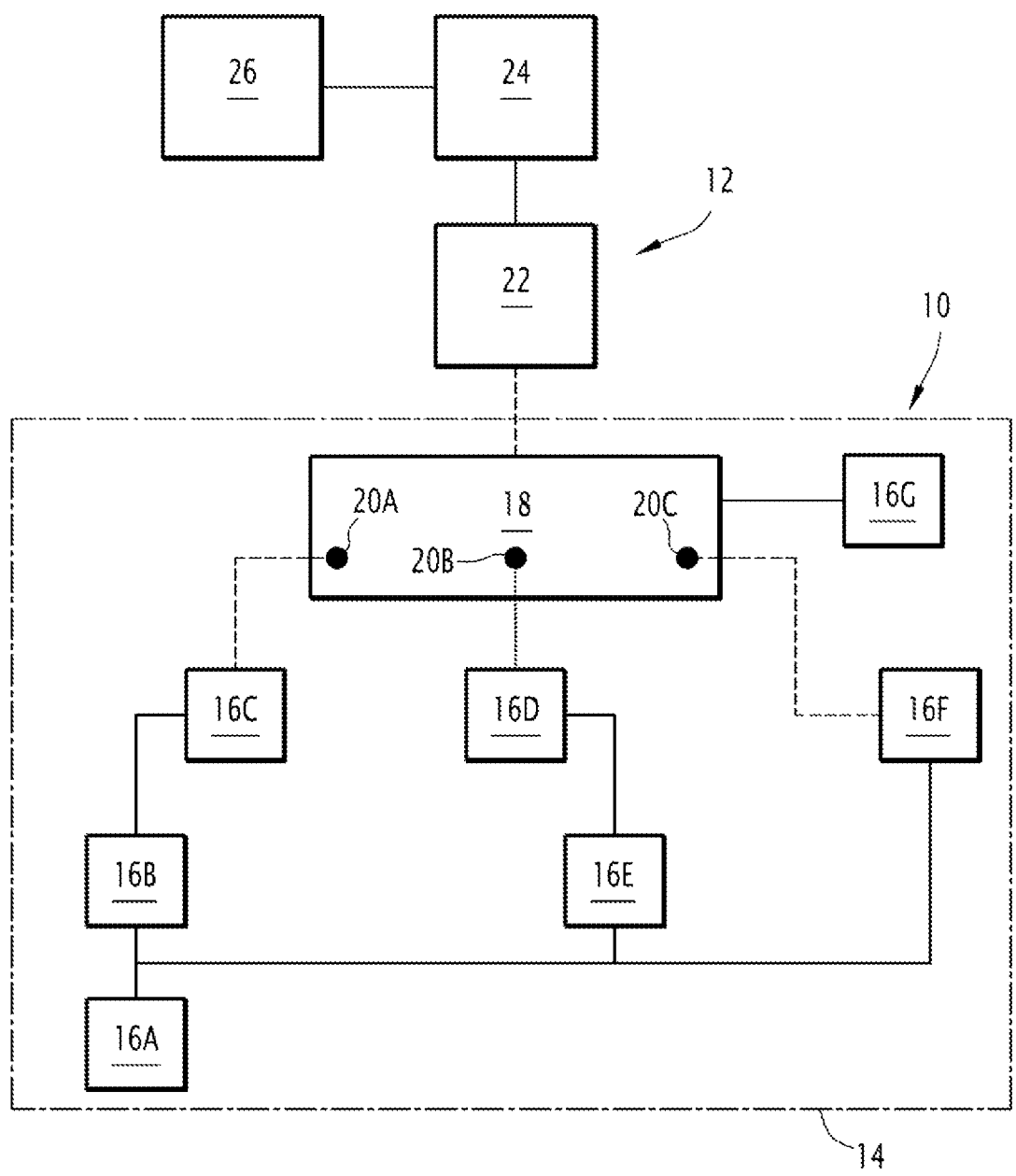
FIG. 1 is a diagrammatic view of a functional aircraft assembly provided with a fault analysis system according to the invention.

In reference to FIG. 1, a first method according to the invention is designed to analyze faults present on a platform 10 using an implementation system 12.

The platform 10 is advantageously an aircraft. The platform comprises a plurality of functional assemblies 14 designed for the operation of the platform 10. In the case of an aircraft, the functional assemblies 14 are in particular designed for steering the movement of the platform on the ground, or during flight.

The functional assembly 14 generally comprises a multitude of equipment marked 16A to 16F in the example of FIG. 1, and a control and detection unit 18 connected to the equipment 16A to 16F.

The various pieces of equipment 16A to 16F are mechanically, electrically and/or hydraulically connected to one another and/or to the unit 18 to be steered by the unit 18 under the action of at least one control member 16G.

The unit 18 is advantageously provided with detectors 20A, 20B, 20C, capable of detecting the breakdown symptoms present on the equipment 16A to 16F.

In one particular example provided as an illustration, the control member 16G is for example a control member for the braking of the aircraft. The equipment 16A is for example a hydraulic generator, and the pieces of equipment 16B and 16E are solenoid valves steered by the computer 18. In this particular example, the pieces of equipment 16C, 16D and 16F are pressure gauge switches respectively connected to the left brake, the right brake, and the hydraulic generator, and the detectors 20A, 20B, 20C are respectively capable of measuring the presence of pressure at the pressure gauges 16C, 16D, 16F.

The analysis system 12 includes a computer 22 comprising means for implementing the method including a processor and a memory capable of containing at least one database.

The computer 22 is for example onboard the platform 10. Alternatively or complementarily, the computer 22 is positioned away from the platform 10 on the ground and can be connected to the platform.

The computer 22 is connected to each control unit 18 of a functional assembly 14 and/or to each piece of equipment 16A to 16G by wired transmission means and/or wireless transmission means, for example using a digital bus.

The computer 22 comprises a user interface, in particular a display device 24 and an input peripheral 26.

In the event the computer 22 is onboard the platform 10, the display 24 is for example present in the control cockpit of the platform 10, to be accessible by the pilot of the platform 10.

As will be seen below, all of the equipment 16A to 16G is capable of having one or more elementary faults that will be designated by the term "fault mode." Each fault mode is associated with a particular piece of equipment. It is capable of creating one or more observable symptoms on the platform, the symptoms being able to be shared by several fault modes of a given piece of equipment or by several fault modes of several distinct pieces of equipment.

The presence of each of the observable symptoms must therefore be measured to try to determine the origin of the fault, and subsequently the fault mode(s) that may be involved.

Each symptom can be an observable symptom in terms of the digital data conveyed within the platform, for example such as data obtained from a detector 20A to 20C, such as a pressure switch, or physical size measured on a piece of equipment such as a hydraulic pressure.

Alternatively or additionally, certain symptoms are symptoms that can be observed or measured by an outside operator, for example such as the presence of smoke, sweating, or confirmation by the operator of the proper operation of a given piece of equipment, in particular when that equipment has been replaced.

Figure 2:
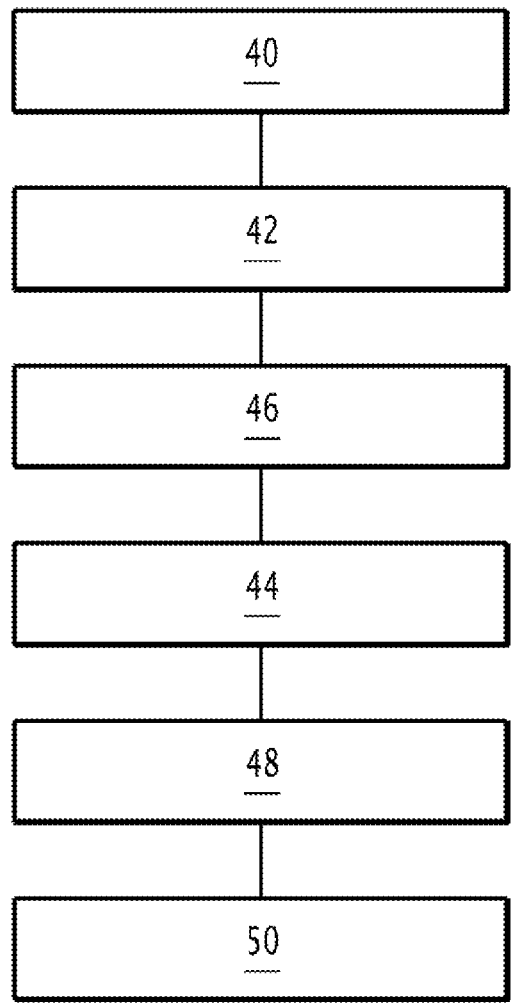
FIG. 2 is an overview diagram showing the different steps of the first analysis method according to the invention.

In reference to FIG. 2, the method according to the invention comprises at least one step 40 for providing a table of correspondence 60 (visible in FIG. 9) among a plurality of symptoms Si to be observed and default modes MDi capable of creating each symptom to be observed Si, and the step 42 for measuring the symptoms Si present on the platform. According to the invention, the method comprises a step 44 for establishing at least one fault family FPi, each fault family comprising at least one fault mode MDk having one or more present symptoms. The fault family groups together, for each fault mode MDk, all of the fault modes MDi associated with each present symptom of the fault mode MDk, the family being established based on the measured present symptoms Sk and the table of correspondence 60.

Advantageously, the method also comprises, before step 44 for establishing fault families, a step 46 for preprocessing the observed symptoms to select only the symptoms determined as actually being present.

The method also comprises a step 48 for determining subsets of minimum faults capable by themselves of creating all of the symptoms associated with all of the fault modes within a same fault family.

The method according to the invention can lastly comprise a step 50 for exploiting the data obtained during the preceding steps, for fault resolution purposes.

In the supply step 40, a table of correspondence 60, an example of which is illustrated in FIG. 9, is established between each fault mode MD1 to MD12 inventoried for all of the equipment of the functional assembly 14 and the symptoms S1 to S7 respectively associated with each of the observed fault modes MD1 to MD12.

Thus, as illustrated in FIG. 9, the table 60 lists (in its rows in FIG. 9), for each particular fault mode MD1 to MD12 associated with the functional assembly 14, the observable symptoms S1 to S7 associated with that particular fault mode.

Likewise, the table 60 lists (in its columns in FIG. 9), for each observable symptom S1 to S7, the or each fault mode capable of creating the symptom S1 to S7.

Advantageously, the table 60 also comprises, for each symptom/fault mode pair (Si/MDj), a qualification of the systematic or nonsystematic nature of the symptom Si when the fault mode MDj is present.

The table 60 or another similar table may comprise a weighting system (shown in parentheses in FIG. 9) of the individual weight of each symptom Si among the symptoms capable of creating a given fault mode.

As seen above, the different fault modes MD1 to MD12 are each associated with a particular piece of equipment 16A to 16F. Thus, in the example shown in FIG. 9, the first two fault modes MD1 and MD2 are associated with the first piece of equipment 16C, fault modes MD3 and MD4 with a second piece of equipment 16D, and so forth.

In the example described above, fault modes MD1 and MD2 are in particular associated with the left pressure gauge switch of the braking system. Modes MD1 and MD2 are for example respectively a "left pressure gauge switch blocked closed" and "left pressure gauge switch blocked open." They are capable of creating the following symptoms S1 and S2, respectively: "left brake pressure present whereas braking is not commanded by the computer" and "left braking pressure null whereas braking is commanded by the computer."

As shown in FIG. 9, the same symptom Si can be associated with several fault modes.

Thus, in the above example, the symptom S1 "left brake pressure present whereas braking is not commanded by the computer" is associated with fault mode MD1 described above and fault mode MD5 "left solenoid valve blocked open."

Furthermore, certain symptoms, such as in particular symptoms S1 and S2 described above, are marked as systematic, which is shown by x's in FIG. 9.

The symptoms that are marked as nonsystematic are shown by circles in the example of FIG. 9. In the example illustrated above, these symptoms S1 to S6 are non-systematic in fault mode MD12, which corresponds to a flaw in the control unit 18.

The weighting of the individual weight of each symptom for a given fault mode is shown by a number in parentheses in FIG. 9. This number is for example determined as a percentage. Thus, the sum of the likelihoods of all of the symptoms associated with a particular fault mode (in a given row of the Table in FIG. 9) is equal to 100.

The table 60 is advantageously stored in the memory of the computer 22.

During the measuring step, the computer 22 receives measurements of the different observable symptoms, either directly by the transmission of data from the detectors 20A, 20B, 20C through the digital bus, or through manual input by an operator using the interface 24 or by any other transmission means to the computer.

Each measured symptom is then classified according to a value equal to "true" or "false" representative of the raw presence of the symptom, and is advantageously associated with a validity or invalidity criterion of the symptom.

Figures 3, 4:
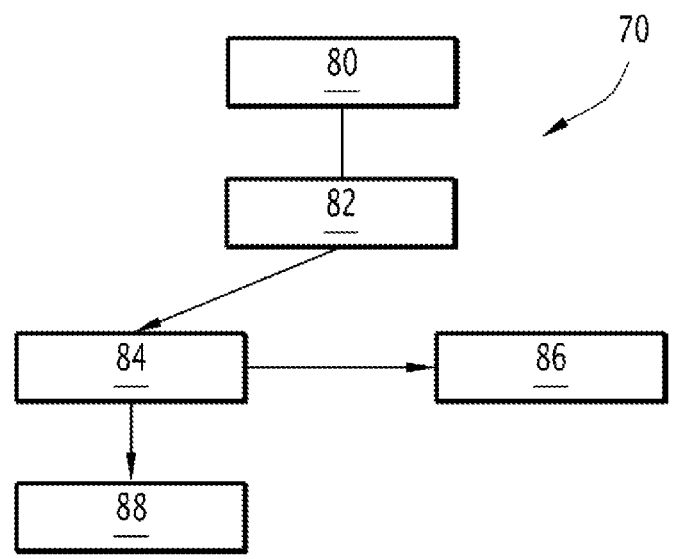
FIG. 3 is an overview diagram similar to that of FIG. 2 showing the different phases of a first preprocessing step of the fault modes.
FIG. 4 is a table illustrating the classification of the observed symptoms as a function of their relevance and validity.

As illustrated in FIG. 4, each observable symptom is thus measured and is shaped independently of the other symptoms by as simple an equation as possible that does not, if possible, integrate combinatory processing. The time aspect and the complex deterministic logic aspects are implemented in the equation of the symptom itself.

Thus, depending on the state of the functional assembly 14, each symptom is measured as having a "true" or "false" value, respectively represented by the squares and barred circles in FIG. 4.

Furthermore, a validity criterion of the observed symptom is advantageously associated with each symptom measured as a function of the measurement context. This criterion is for example "valid" ("V" in the table of FIG. 4) or "not valid" ("NV" in the table of FIG. 4). A symptom is qualified as "not valid" by the computer 22 or the operator when the context of the appearance of the symptom is improbable. Failing this, each symptom is considered "valid."

When the symptom is valid and true, the symptom is then determined to be "present" by the computer 22. Conversely, if the symptom is false and valid, it is considered "absent."

The measurement step 42 therefore allows the computer 22 to determine a first group of "present" symptoms, which will be used for the subsequent analysis, and potentially a second group of "absent" symptoms.

In the example illustrated in FIG. 4, the symptom S1 described above is valid and true, as well as symptoms S3 ("right brake pressure present whereas braking is not commanded") and S7 ("I declare unit 18 non-functional"). Each of symptoms S1 to S3 is therefore declared "present." Symptoms S2, S5 and S6 are not valid.

Next, when it is present, the preprocessing step 46 is carried out.

This step 46 comprises a phase 70 for developing fault modes that may be involved (FIG. 3), and advantageously, a phase 72 for developing the overall likelihood of the present fault modes (FIG. 5).

During the phase 70, the fault modes are classified by the computer 22 among a first group of fault modes called "potentially active," a second group of fault modes called "potentially inactive," and a third group of fault modes called "unknown status" as a function of the value and validity of the symptoms obtained in the measuring step 42, the list of fault modes checked by each symptom in the table 60, and the type of dependency relationship of the symptom in each fault mode ("systematic" or "non-systematic"), as they are listed in table 60.

To that end, in an initial subset 80, the computer 22 places all of the fault modes in the unknown state. Then, during a processing sub-step 82, all of the "present" symptoms are isolated.

For each "present" symptom Si, all of the fault modes capable of creating the symptom Si are distributed between the "potentially active" state and the "potentially inactive" state.

In this respect, each fault mode MDj capable of creating the present symptom Si is first declared "potentially active" (sub-step 84).

Then, all of the symptoms Sj relative to that "potentially active" fault mode MDj are scanned. If a symptom Sj exists that is classified as systematic in the table 60 and that is classified as "absent" in the measuring step 42, the fault mode MDj is classified as "potentially inactive" (step 86).

On the contrary, if all of the symptoms Sj marked as systematic in the table 60 are determined to be present in the measuring step, the fault mode MDj is kept as "potentially active."

Thus, in the example illustrated in the Figures, symptom S1 "left brake pressure present whereas braking is not commanded by the computer" is systematic and constitutes the only systematic symptom of fault mode MD1 ("Left pressure gauge switch blocked closed"). Symptom S1 is therefore classified as potentially active.

The phase 70 therefore makes it possible to eliminate the fault modes whereof at least one of the symptoms systematically created by that fault mode is missing during the measuring step 42 from the subsequent analysis.

A list of potentially active symptoms, among the measured symptoms, is therefore selected by the computer 22, for the subsequent analysis of the fault families and the subsets of minimum faults within each fault family.

In reference to FIG. 5, during the phase 72 for developing the overall likelihood of the fault modes, an overall likelihood criterion of the presence of each fault mode in the functional assembly 14 is calculated by the computer 22.

To that end, as illustrated by FIG. 5, the likelihood of each fault mode is calculated, as an increasing function of the number of present symptoms observed in the measuring step 42 capable of being created by the fault mode in question.

Thus, this phase 72 makes it possible to determine that a fault mode is 100% likely if all of the symptoms it creates are present.

Advantageously, this phase 72 also comprises a step for weighting the likelihoods observed using a predetermined table of correspondence of the appearance of each fault mode on each piece of equipment as a function of the usage time of the functional assembly 14.

This table (not shown) for example lists, for each fault mode of each piece of equipment 16A to 16F and 18 of the functional assembly 14, a predetermined time occurrence value of that fault mode, as it is generally observed on the platform 10 or on other platforms of the same type.

This occurrence value corresponds to the number of times the fault mode has been observed for a predetermined number of flight hours of the aircraft.

The phase 72 comprises a sub-step 90 for establishing, by the computer 22, a weighting vector built on the basis of all of the symptoms listed in the table 60. To that end, a symptom present in the measuring step 42 is associated with a first value, in particular equal to 1, and an absent symptom is associated with a second value of the weighting vector, in particular equal to 0.

During the sub-step 92, the weighting vector is multiplied by the matrix formed by all of the weightings of the individual weights of each symptom in the table 60 to yield a raw overall likelihood vector for the fault modes.

Then, an overall likelihood factor is advantageously calculated by the computer 22, by multiplying each individual value of the overall likelihood vector associated with a given fault mode by the predetermined appearance occurrence value of that fault mode as it is defined in the appearance occurrence table.

Figures 7, 8:
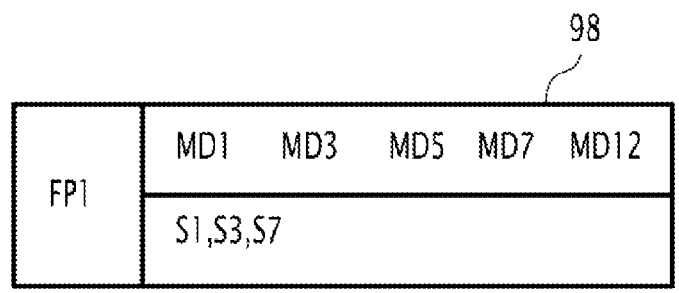
FIG. 7 is a table illustrating the content of a fault family.
FIG. 8 shows a table illustrating the overall likelihoods calculated for the different fault modes.

The overall likelihood vector can then be displayed on the interface 24 while being associated with each listed fault mode, as illustrated in FIG. 8 (sub-step 94).

This display illustrates, for each fault mode MD1 to MD12, the overall likelihood of occurrence of the fault mode, which is expressed by a representative number of occurrences per hour of flight. In the example illustrated in FIG. 8, only fault modes MD1, MD3, MD5, MD7 and MD12 have a nonzero overall likelihood.

The overall likelihood of fault mode MD12 ("faulty control unit") is greater than that of each of the other fault modes MD1, MD3, MD5 and MD7.

Furthermore, the fault modes associated with the blocking of the left or right pressure gauge in the closed position (MD1 and MD3) have a lower likelihood than the fault modes associated with blocking in the open position of a left or right solenoid valve (MD5 and MD7).

It is therefore possible to guide the maintenance operator in the fault resolution process.

Step 44 for establishing at least one fault family is diagrammatically illustrated by FIG. 6.

This step comprises the determination of at least one fault family FPi that groups together all of the fault modes that share at least one present symptom.

The fault family can comprise a single fault mode if no other fault mode comprises a present symptom in common with the symptom(s) capable of being created by the single fault mode.

On the contrary, each fault family having several fault modes comprises at least one symptom shared with each pair of fault modes of the family. Nevertheless, no symptom relative to a fault mode of a first fault family is shared with a fault mode of a second fault family. To that end, each fault mode belongs to a single family and each symptom is associated with one or more fault modes of a single family.

Step 44 therefore makes it possible to establish the list of potentially active fault modes associated with each fault family, and the family of each potentially active fault mode.

Likewise, step 44 makes it possible to obtain the list of measured present symptoms associated with each fault family and the family of each present symptom measured in the measuring step 42.

This establishment is done based on the table 60, and in particular based on the list of fault modes checked by each given symptom, and the list of symptoms capable of being created by each fault mode. It is also created from the list of potentially active fault modes determined in the preprocessing step based on the value and validity of the symptoms.

The fault family can be illustrated diagrammatically by the table 98 in FIG. 7. Each fault family FPi includes a list of fault modes MDi and a list of symptoms Si, each of the fault modes MDi having at least one symptom in common with another fault mode, the family FPi comprising all of the fault modes capable of creating a symptom of the given family.

In the example shown in FIG. 7, the family FP1 groups together fault modes MD1 ("left pressure gauge switch blocked off"), MD5 ("left solenoid valve blocked open") and MD12 ("faulty computer"), which share potentially active present symptom S1 ("left brake pressure present whereas braking is not commanded").

Furthermore, mode MD12 is capable of creating potentially active present symptom S3 ("right brake pressure present whereas braking is not commanded"). Family FP1 therefore also groups together all of the fault modes capable of creating that potentially active present symptom S3, i.e. mode MD3 ("right pressure gauge switch blocked closed") and mode MD7 ("right solenoid valve blocked open").

To obtain each family, step 44, carried out by the computer 22, includes an initialization phase 100, then an iteration loop 102 scanning all of the potentially active fault modes in order to obtain, in a final phase 104, all of the families.

During the initialization phase 100, all of the potentially active fault modes are defined as not belonging to any fault family.

Likewise, the present symptoms are initialized as not belonging to any fault family.

The loop 102 is then started to successively scan all of the potentially active fault modes previously detected.

For each checked potentially active fault mode MDi, the list of symptoms capable of being created by that fault mode MDi is first inventoried during phase 106, based on the table 60.

If the fault mode MDi does not already belong to another fault family, a new fault family FPj is created (phase 108).

If, on the contrary, the fault mode MDi already belongs to a fault family FPk, no fault family is created (phase 110).

During phase 112, the list of present symptoms capable of being created by fault mode MDi is obtained.

Then, for each symptom relative to the mode MDi checked in step 112, the computer 22 determines the set of fault modes MDk other than mode MDi capable of being created by that symptom. For each potentially active fault mode MDk, the computer 22 determines whether the fault mode MDk already belongs to another fault family.

During phase 114, if the fault mode MDk does not belong to any fault family, the computer places the fault mode MDk in the current fault family FPj and stores that the current family FPj contains that fault mode MDk.

On the contrary, during phase 116, if this fault mode MDk already belongs to another fault family FPm, different from the current fault family FPj, the two fault families FPj and FPm are merged to create a new fault family FPj during step 118.

Then, the iteration loop 102 continues until all of the potentially active fault modes have been scanned.

The determination of the fault families FPi therefore makes it possible to show the presence of independent faults, since each family FPi covers one or more fault modes independent of the fault modes of each other family. It is then possible to distinguish between different fault modes within each fault family.

The maintenance operations performed on the platform 10 are therefore simplified to process the different fault families independently.

In step 48, the computer 22 determines, for each fault family, the subset(s) of minimum fault modes which, by themselves, could explain all of the symptoms associated with all of the fault modes belonging to the same fault family.

In a first alternative, this determination could lead to obtaining a single subset containing a single fault mode capable of explaining all of the symptoms.

As will be seen below, this is the case of the example illustrated in FIGS. 1 to 13, where fault family FP1 includes a single subset made up of a single fault mode MD12 ("computer deficient") capable of explaining, by itself, all of the observed symptoms S1 and S3.

In a second alternative, the determination leads to a subset N-Ui of fault modes if the set of present symptoms does not make it possible to eliminate the ambiguity between the fault modes of that subset.

In a third alternative, the determination leads to the obtainment of a plurality of separate subsets, each subset containing one or more fault modes.

The obtained subset(s) is/are designated by the term "N-Uplet."

Figure 10:
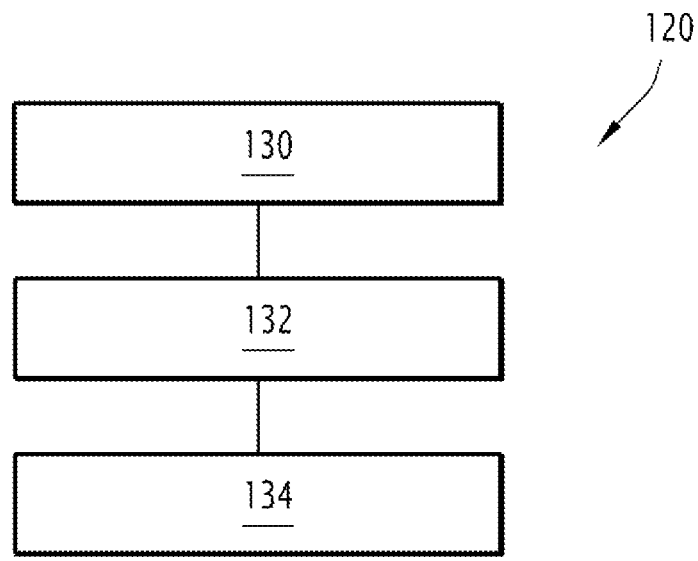
FIG. 10 is a diagram similar to that of FIG. 2 illustrating the phase for listing the potentially active fault modes associated with each family.
Figure 11:
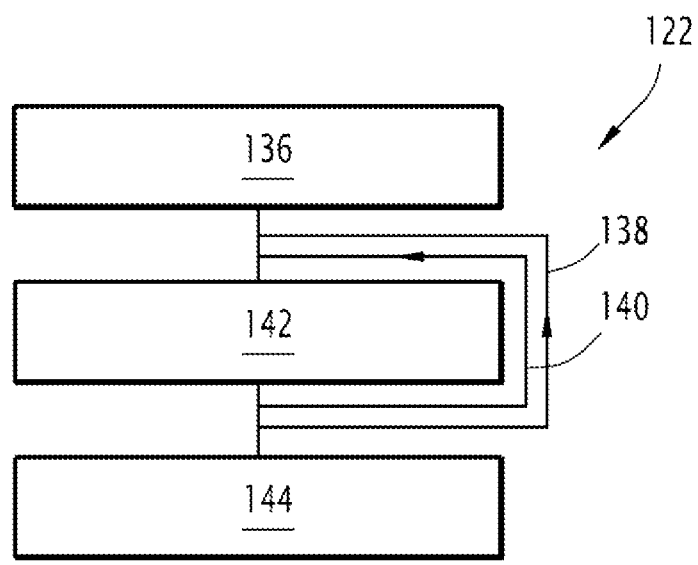
FIG. 11 is a view similar to FIG. 10 illustrating the phase for determining the minimum list of the fault modes of each family.

Step 48 advantageously includes, for each fault family FPi, a first phase 120 for selecting potentially active fault modes capable of creating each present symptom associated with the fault family FPi (FIG. 10), then, advantageously, a phase 122 for determining the minimum list of present symptoms associated with that family FPi (FIG. 11).

Step 48 then includes a phase 124 for establishing the list, for each fault family FPi, of the subsets of fault modes that are capable of creating, by themselves, all of the symptoms present in the fault family (FIG. 12), this establishment being done by the intersection between all of the potentially active fault modes created by each present symptom of the fault family.

In reference to FIG. 10, phase 120 comprises the establishment, by the computer 22, of the list of all of the potentially active fault modes capable of having created a present symptom in the fault family FPi.

To that end, during sub-step 130, the list of fault modes associated with each family and each symptom associated with the family is obtained. In step 132, only the potentially active fault modes are retained. In step 134, the list of the potentially active fault modes of each present symptom is then stored for each family.

During the phase 122 for establishing the minimum list of the symptoms associated with each family, the computer 22 isolates only the present symptom(s) among all of the present symptoms that are capable of having created the same list of potentially active fault modes.

Furthermore, phase 122 includes the isolation of the present symptoms, capable of being created by a list of potentially active fault modes that is not one over list of potentially active fault modes associated with another symptom.

In particular, a symptom S1 that is capable of having been created by a fault mode MD1, a fault mode MD2, or another fault mode MD3, does not contribute any additional information relative to another symptom S2 that is capable of having been created by fault mode MD1 or fault mode MD2. Subsequently, symptom S1 is not kept at the end of that step.

To that end, after an initialization phase in which the list of potentially active fault modes of each symptom of each family is prepared (sub-step 136), a first loop 138 of iterations is done to scan each family FPk and a second loop of iterations 140 is done to scan each symptom Sk of the analyzed fault family FPk.

Each symptom Sk of the analyzed fault family FPk is compared to each other symptom Sm of the fault family FPk in step 142 to determine whether the list of potentially active fault modes created by the other symptom Sm contains, or is equal to the list of the potentially active fault modes of the considered symptom Sk of fault family FPk.

In that case, the other symptom Sm is removed from the current fault family, since the first symptom Sk provides enough information.

In step 144, a minimum list of symptoms Sk associated with each family FPk is therefore obtained.

Figure 12:
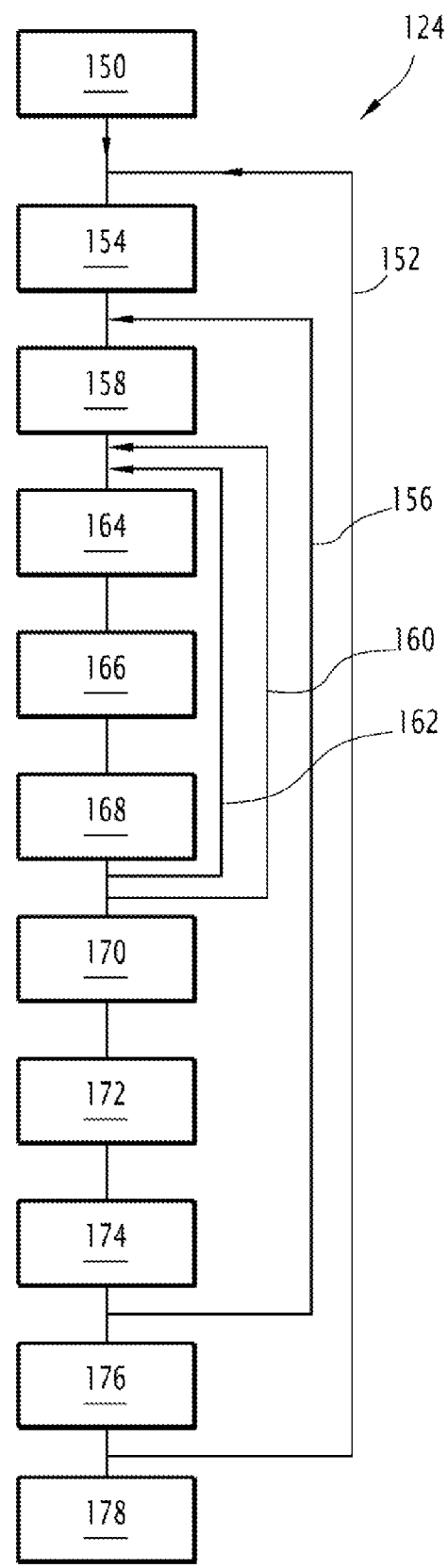
FIG. 12 is a view similar to FIG. 2 illustrating the step for determining the minimum subsets.

FIG. 12 illustrates an overview diagram of the implementation of phase 124 for preparing the subset(s) of fault modes capable of creating, by themselves, all of the symptoms present in the family.

This phase is done by determining the intersection up to convergence of the checked potentially active fault modes in order to obtain either a single subset of fault modes that can, by themselves, explain all of the symptoms, said single subset being able to include one or more fault modes, or a plurality of subsets which can each explain all of the observed symptoms, each subset comprising one or more fault modes.

This intersection is obtained from the minimum list of present symptoms associated with each fault family as it was sorted during phase 122. It is also obtained from the list of the potentially active fault modes of each present symptom in each fault family, as obtained during phase 120.

These two lists are first used by the computer during sub-step 150. Then, a first iterative loop 152 is launched to scan each fault family.

This loop first comprises a subset 154 for initializing a plurality of subsets N-U(init)i equal to number of present symptoms in the minimum list of present symptoms associated with the family (sub-step 154).

Each subset N-U(init)i created during the initialization step 154 includes fault modes MDj of a particular symptom Sj.

Then, the computer 22 carries out a second iteration loop 156 to proceed with the intersection, two by two, of the subsets thus initialized.

During each cycle of the second loop 156, the intersection between the subsets N-U(p)i obtained in the preceding cycle p is done two by two to create the subsets N-U(p+1)i of the current cycle.

To that end, as illustrated in FIG. 12, an initialization sub-step of the subsets of the current cycle N-U(p+1)i is first done (sub-step 158). These subsets are initially empty.

Likewise, a convergence criterion of the second loop is first initialized at a value equal to "convergence obtained," which corresponds to the absence of possible intersection between the different subsets.

Then, a third iteration loop 160 is launched to scan each subset of the preceding cycle N-U(p)i with current rank i, and a fourth iteration loop 162 is performed upon each iteration of the third loop 160 to perform the intersection of the subset of the preceding cycle N-U(p)i with current rank i with each subset of the preceding cycle N-U(p) with higher rank i+1 scanned in the fourth loop 162.

To that end, the or each fault mode of the subset N-U(p)i of current rank i scanned in the third loop 160 is successively compared to the or each fault mode of the higher-ranking subset N-U(p)i+1.

If one of the fault modes MDj is shared between the subsets N-U(p)i and N-U(p)i+1, the subset N-U(p+1)i of the current cycle integrates that fault mode and the convergence indicator goes from the "convergence obtained" state to a "convergence not obtained" state.

This operation is done successively for all of the subsets N-U(p)i+1 with a rank higher than rank i of the considered subset N-U(p)i.

In the event no intersection is obtained, i.e. when the subset of the current cycle N−U(p)i does not integrate any fault mode, since no fault mode of the subset N-U(p)i of the preceding cycle with rank i is shared by a fault mode of the higher-ranking subset N−U(p)i+1, the value of the subset N-U(p+1)i of the current cycle p+1 is then equalized at the value of the subset N-U(p)i of the preceding cycle, unless that subset N-U(p)i has already been stored (sub-step 166).

Then, if the subset with the highest rank z of the preceding cycle N-U(p)z has never successfully intersected another subset of the preceding lower-ranking cycle, i.e. it does not comprise any fault mode in common with a subset having a lower rank, the sub-step 168 is carried out.

In that sub-step, if the subset of the preceding cycle N-U(p)z of current rank does not have a preceding cycle subset of higher rank, and it has not, as higher-ranking subset, been at the origin of the creation of the subset N-U(p+1)i of the current cycle, then a new subset of the current cycle N-U(p+1)z is created with identical content to the subset N−U(p)z of the preceding cycle.

Then, the loops 160, 162 are continued to scan all of the subsets of the preceding cycle and build the subset(s) N-U(p+1)i of the current cycle p+1.

Then, during the sub-step 170, the duplicates among the subsets N-U(p+1)i of the current cycle p+1 are eliminated. Thus, during sub-step 172, each subset N-U(p+1)i of the current cycle with current rank i, is compared to each subset of the current cycle N−U(p+1)i+1 of higher rank i+1.

The list of the fault modes of the subset N-U(p+1)i of the current rank i is compared to the list of the fault modes of the subset of higher rank N-U(p+1)i+1.

If these lists are identical, the subset of higher rank N-U(p+1)i+1 is deleted from the list of subsets for the current cycle.

Furthermore, if the list of potentially active fault modes of the subset of higher rank N-U(p+1)i+1 contains or is equal to the list of potentially active fault modes of the fault mode of current rank N-U(p+1)i, the subset of higher rank examined for the current cycle N-U(p+1)i+1 is deleted, since the subset of current rank N-U(p+1)i provides enough information.

Then, if at least one intersection between two subsets has occurred during the current iteration of the second loop, and the convergence indicator indicates that the convergence is "not obtained," a new cycle for establishing subsets according to the second loop 156 is done.

When the convergence is achieved on the second loop 156, the final subset(s) N-U(final)i capable of explaining all of the present symptoms of the fault family are stored by the computer 22 during sub-step 176.

Then, when each fault family has been scanned and the convergence criterion has been achieved for each fault family, the computer 22 stores the list of subsets N-U(final)i obtained for each fault family.

Figure 13:
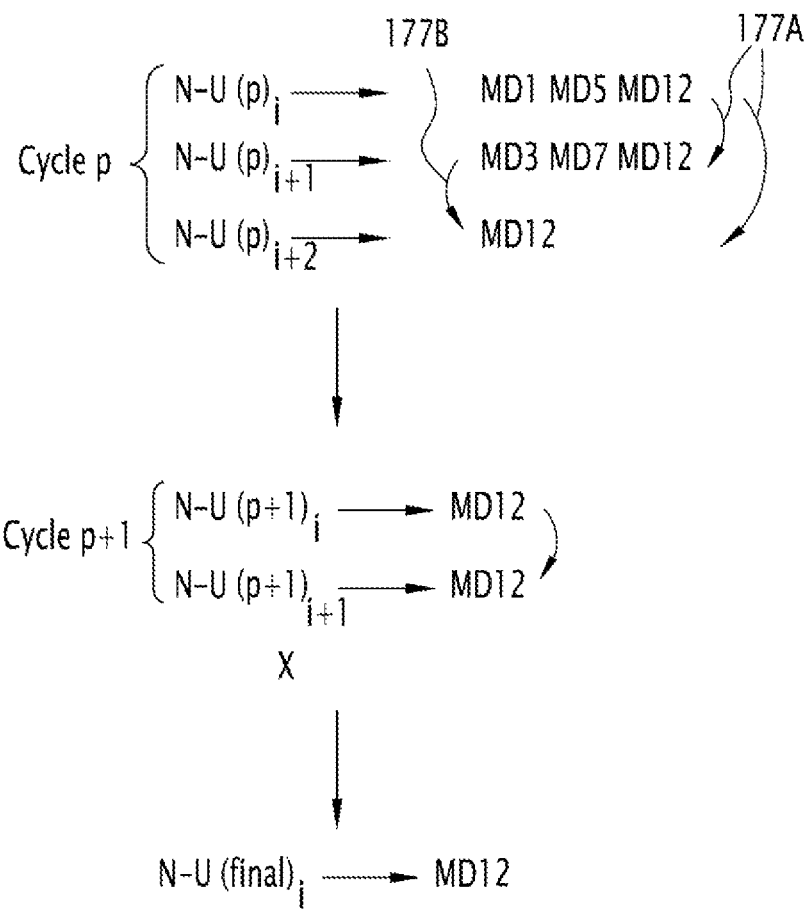
FIG. 13 is a diagrammatic view illustrating one embodiment of the step for determining the subsets in which a single subset is obtained.
Figure 14:
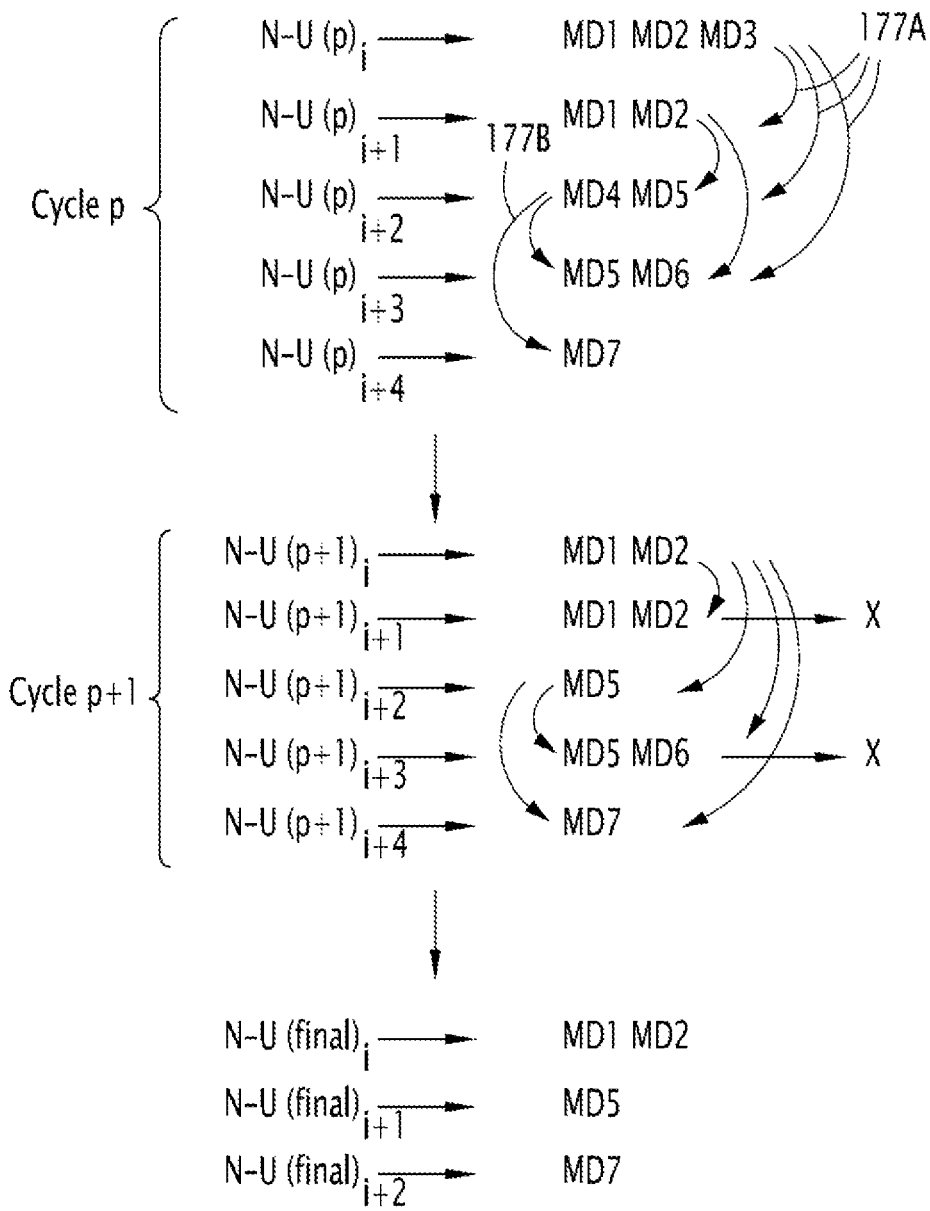
FIG. 14 is a view similar to FIG. 13 in which several distinct subsets are obtained.

Examples of the obtainment of subsets are illustrated by FIGS. 13 and 14 for two different fault families.

In FIG. 13, three present symptoms S1, S3, S7 initially respectively correspond to different sets of fault modes that make up the three initial subsets N-U(p)i.

The intersection (shown by arrows 177A) between each preceding cycle subset N–U(p)i, and the preceding cycle subsets with higher ranks N-U(p)i+1 and N-U(p)i+2 leads to the obtainment of a single fault mode MD12 in the current cycle subset N-U(p+1)i.

The intersection (shown by arrows 177B) between the preceding cycle subset N–U(p)i+1 and the preceding cycle subset N-U(p)i+2 with higher rank i+2 also leads to the obtainment of the single fault mode MD12.

The subset of rank N-U(p)i+2 having been the subject of an intersection with at least one of the higher-ranking subsets, it is not kept.

Two identical subsets N-U(p+1)i and N-U(p+1)i+1 are obtained. Since the lists of fault modes of these two subsets are identical, only the list N-U(p+1)i with the unique fault mode MD12.

In this case, the method according to the invention therefore shows a single subset N-U(final)i capable of explaining all of the observed symptoms, that subset containing a single fault mode MD12 in this example.

In the specific example described above, this mode MD12 corresponds to a deficiency of the control unit 18, which must be changed.

Conversely, in the example of FIG. 14, the intersection between the five subsets N-U(p)k initiated during the preceding cycle p makes it possible to obtain, in cycle p+1, five current-cycle subsets, in particular since the subset N-U(p+1)i+5 that comprises fault mode MD7 has not been subject to any intersection with a higher-ranking subset.

During the duplicate elimination step, subset N-U(p+1)i+1 is identical to subset N–U(p+1)i+2 and is therefore not kept.

Furthermore, the list of the fault modes of subset N-U(p+1)i+3 ranking higher than fault mode N-U(p+1)i+2 contains the list of potentially active fault modes N-U(p+1)i+2. The subset N-U(p+1)i+3 is not kept.

Ultimately, after convergence, three subsets N-U(final)k are obtained, which means that the fault family comprises several faults capable of explaining all of the symptoms.

Furthermore, within at least one subset N-U(final)i, a plurality of fault modes are obtained, which means that the fault associated with that fault mode is ambiguous and that the operator must discriminate between the two observed fault modes MD1, MD2.

After the step for obtaining the different subsets, a probabilistic analysis step can then be carried out by the computer 22.

This analysis makes it possible to obtain the occurrence, for example as a percentage, of the different fault modes associated with each family, and/or the occurrence, in particular as a percentage, of the fault modes associated with each fault mode within each subset N-U(final)i of each family.

The analysis is done from the list of fault modes associated with each family obtained at the end of step 44, and from the list of subsets of each family obtained at the end of step 48.

It is also based on an appearance occurrence table of each fault mode of each piece of equipment defining, for each fault mode, a predetermined elementary occurrence value per unit of time. This value can for example be calculated in number of occurrences per unit of time, in particular per unit of usage time of the platform 10, advantageously in number of occurrences per hour of flight.

When the analysis step is carried out, the list of potentially active fault modes associated with each family is scanned. For each potentially active fault mode in the family, the occurrence probability of the potentially active fault mode is calculated by dividing the elementary value obtained from the occurrence table for that fault mode by the sum of the elementary probabilities of the potentially active fault modes of the family.

Likewise, the list of potentially active fault modes associated with each subset is scanned. For each potentially active fault mode of the subset, the probability of occurrence of the potentially active fault mode is calculated by dividing the elementary value obtained from the occurrence table for that fault mode by the sum of the elementary probabilities of the potentially active fault modes of the subset.

Then, during the exploitation step 50, all of the results obtained by the computer 22 are advantageously displayed by the interface 24 to be used in order to perform a maintenance operation.

Thus, one and/or the other of the following results can be displayed:

(i) list of potentially active fault modes (obtained at the end of step 46);

(ii) list of potentially inactive fault modes (obtained at the end of step 46);

(iii) list of fault modes with unknown status (obtained at the end of step 46);

(iv) overall likelihood of the fault modes, as obtained at the end of step 46.

(v) list of the fault modes associated with each family (obtained at the end of step 44);

(vi) family of each potentially active fault mode (obtained at the end of step 44);

(vii) list of the subsets of each family capable of explaining all of the present symptoms of each family (obtained at the end of step 48);

(viii) occurrence as a percentage of the fault modes associated with each family;

(ix) occurrence of a percentage of the fault modes associated with each subset.

Results (i), (ii) and (iii) are capable of allowing the operator to determine what faults are possible. The list of potentially inactive fault modes may make it possible to clear certain faults.

When the fault is truly complex, result (iv) makes it possible to isolate the pieces of equipment that appear to be working, but which must be verified for an uncommon fault.

The classification families, as obtained using the method according to the invention, make it possible to discriminate whether a single fault may be the origin of all of the observed symptoms, or if the functional assembly 14 of the platform 10 is undergoing several a priori independent faults.

By classifying the fault modes in families (results (v) and (vi)), is possible to focus specifically on resolving faults on fault modes associated with the family.

Furthermore, within each family, the list of subsets makes it possible, as seen above, to determine whether one or several fault modes are capable of explaining all of the symptoms, or if several subsets are necessary to explain all of the symptoms, each subset being able to include one or more possible fault modes.

The obtained results are quantified owing to outputs (viii) and (ix).

The analysis done using the method according to the invention can be iterative. In this way, once a piece of equipment is replaced, it is possible to deactivate the fault modes relative to that equipment and reimplement the aforementioned steps 40 to 50, while eliminating a certain number of fault modes associated with the equipment in question from the table of correspondence 60.

Subsequently, the first implementation of step 46 is done using a first set of measured symptoms, and the second implementation is done using a second, smaller set of symptoms.

In one example, a first implementation phase of steps 40 to 50 of the method according to the invention makes it possible to determine that a single piece of equipment 16A to 16F may be at fault. Then, when the fault continues despite the replacement of that piece of equipment, the method is implemented once again to determine what other pieces of equipment may be at fault, while no longer taking into account fault modes associated with the replaced equipment.

In the example illustrated in the Figures, the method can be implemented the first time with present symptom S7 "I declare the control unit nonfunctional," in addition to symptoms S1 and S3. This then leads to the obtainment of a single fault family FP1 including a single subset MD12 ("control unit deficient").

Once the control unit is replaced, the method is implemented a second time while declaring symptom S7 absent. The method leads to the obtainment of two fault families FP2, FP3 respectively comprising fault modes MD1 ("left pressure gauge switch blocked closed") and MD5 ("left solenoid valve blocked open") for FP2 and MD3 ("right pressure gauge switch blocked closed") and MD7 ("right solenoid valve blocked open") for FP3. The determined subsets in each family FP2 and FP3 each include two fault modes, MD1, MD5 and MD3, MD7, respectively, making up the family FP2, FP3. Two groups of independent faults are therefore detected, without being possible to discriminate, within each group, the source of each fault.

Using the method according to the invention, and in particular distributing the faults and families using a global analysis of the obtained symptoms, then potentially the dynamic intersection of each fault family obtained to identify the minimum set of non-discriminable faults, makes it possible to do away with the traditional approach, in which a fault is modeled in the form of fixed equations, to the benefit of an overall likelihood analysis.

This offsets the problem of faults that are not fully modeled, and the captured signature of which differs from a theoretical signature for which the observed symptoms do not correspond to any known complete signature.

This global approach greatly simplifies the processing of the breakdowns and takes a larger quantity of data into account, without increasing the complexity of the system.

The method according to the invention is therefore particularly effective to determine complex faults, as well as simpler faults.

As mentioned above, in step 42 of the method, a validity criterion of the observed symptom is advantageously associated with each symptom measured as a function of the measurement context.

The validity of the symptom can be defined based on an external observability condition, for example "visible only on the ground", "visible only at an altitude higher than a predetermined level", "visible only if a particular equipment is operating".

In order to be valid, the symptom must meet the observability condition.

Additionally, the method according to the invention does not use a global probability approach, for example based on a Bayesian analysis. On the contrary, the method according to the invention classifies into at least one family of faults all the fault modes associated with all the symptoms provided the symptom is measured, without weighting the probability of occurrence of the symptom when establishing each fault family.

The method is initially based on a mere correspondence between the occurrence of a symptom and the associated fault modes as defined in the table of correspondance.

Any fault mode susceptible of creating the symptom is pointed out at the same level and weight as the other symptoms, regardless of the probability of occurrence of the symptom, when establishing the fault family.

The separation of the fault modes into one or several families based on a mere correspondence between the symptoms and the fault modes, allows the splitting of the fault modes into one or several problems which are independent one from the other.

On the contrary, in the prior art methods, for example in the Bayesian method, all the symptoms are considered as a whole and a probability is calculated without separating the symptoms into families. Thanks to the method according to the invention, the different fault families do not share, with regards to the fault situation at any instant, neither a common symptom, nor a common fault.

The solution to the different symptoms observed on the aircraft is therefore split into a sum of solutions which have an empty intersection.

Moreover, the known methods, in particular the Bayesian methods, do not provide a minimal number of fault modes which explain the totality of the present symptoms.

The known methods only determine the most likely fault modes in view of the known symptoms.

On the contrary, when performing step 48 of the claimed method, a minimal solution which explains all the symptoms, formed by one or several fault modes of each fault family provides the operator with one or several potential solutions to its problem.

On the contrary, the known Bayesian methods do not select, among the different fault modes, those which could explain all the observed symptoms.

Additionally, as mentioned above, the determination of the fault families in the method according to the invention is totally independent of the probability of occurrence of a symptom when a fault mode is present.

The method according of the invention therefore alleviates the problems which may arise in the prior art methods when the estimated probability of occurrence of a symptom, is erroneous or is unknown.

As a consequence, the method is deterministic, when establishing the fault families, leading to an increased reliability of the method.

The invention claimed is:

1. A method for analyzing faults present on a platform, in particular an aircraft, including the following steps:
    (a) providing a table of correspondence between a plurality of observable symptoms on the platform and fault modes capable of creating each observable symptom;
    (b) measuring the symptoms present on the platform and selecting at least part of the measured present symptoms;
    (c) establishing at least one family of faults, the establishing comprising:
        obtaining, from the table of correspondence, a list of fault modes capable of creating, alone or in combination, all of the selected symptoms that are present; and, for each fault mode of said list:
        placing the fault mode in a fault family;
        grouping together, within the same fault family as the fault mode, all of the fault modes of said list capable of creating at least one selected present symptom in common with the fault mode.

2. The method according to claim 1, characterized in that the grouping together, within the same fault family as the fault mode comprises checking off each selected present symptom capable of being created by the fault mode and placing, in said fault family, all of the fault modes from said list capable of being created by each checked symptom.

3. The method according to claim 1, characterized in that step (c) creates a single fault family, the single fault family comprising at least one fault mode, the or each fault mode of the fault family being capable of creating each present symptom selected in step (b).

4. The method according to claim 1, characterized in that step (c) creates a plurality of separate fault families, each fault mode of the first fault family not having any selected present symptoms in common with each fault mode of a second fault family.

5. The method according to claim 1, characterized in that step (c) further comprises:
    (c1) scanning each fault mode listed in the list of fault modes to determine whether the scanned fault mode already belongs to a fault family;
    (c2) if the scanned fault mode does not already belong to a fault family, creating a new fault family comprising the scanned fault mode;
    (c3) scanning all of the selected present symptoms capable of being created by the scanned fault mode of the new fault family;
    (c4) checking off, based on the table of correspondence, other fault modes capable of creating said selected present symptoms;
    (c5) determining, for each other checked fault mode, whether that fault mode belongs to another fault family.

6. The method according to claim 5, characterized in that in step (c5), if the fault mode belongs to another fault family, the method includes merging the other fault family with the newly-created fault family, and if not, the method comprises integrating the checked fault mode into the existing family.

7. The method according to claim 1, characterized in that it comprises, between step (b) and step (c), separating the fault modes capable of creating each selected present symptom into a first group of potentially active fault modes and a second group of potentially inactive fault modes, the list of fault modes determined in step (c) including only the potentially active fault modes.

8. The method according to claim 7, characterized in that the table of correspondence includes, for each fault mode, the assignment to each symptom associated with that fault mode of a deterministic criterion of the symptom, to distribute the symptoms of that fault mode between at least a first group of systematic symptoms and potentially at least one second group of non-systematic symptoms,
    the separating step comprising the classification, in the second group of potentially inactive fault modes, of each fault mode not including all of the systematic symptoms from among the list of present symptoms measured in step (b).

9. The method according to claim 1, characterized in that it comprises a step for calculating the overall likelihood of each fault mode associated with at least one present symptom selected in step (b), based on a predetermined representative value of the occurrence of the appearance of the fault mode and a vector representative of the number of present symptoms selected in step (b) among the symptoms associated with fault mode in the table of correspondence.

10. The method according to claim 1, characterized in that it comprises, for each fault family, a step for determining the or each subset of minimum fault modes capable of creating, by themselves, all of the selected present symptoms in the fault family.

11. The method according to claim 10, characterized in that the determination step includes the following sub-steps:
    creating a plurality of initial subsets, each subset containing at least one fault mode associated with a selected present symptom of the family;
    iterative intersection of the initial subsets to determine the fault modes shared between the subsets;
    eliminating the redundant subsets present in the shared fault modes.

12. The method according to claim 10, characterized in that it comprises, for each subset, the calculation of a probability of the occurrence of each of the fault modes present in the subset as a function of a predetermined occurrence value of each fault mode.

13. The method according to claim 1, characterized in that it comprises a first phase for establishing at least one fault family, based on a first set of present symptoms selected in step (b) and from the table of correspondence; then a second phase for establishing at least one second fault family based on the table of correspondence and a second set of selected present symptoms including some of the symptoms from the first set of selected present symptoms, the second set of present symptoms being distinct from the first set of selected present symptoms.

14. The method according to claim 1, characterized in that it comprises carrying out a maintenance step on the platform based on the or each fault family obtained in step (c).

15. The method according to claim 2, characterized in that step (c) creates a single fault family, the single fault family comprising at least one fault mode, the or each fault mode of the fault family being capable of creating each present symptom selected in step (b).

16. The method according to claim 2, characterized in that step (c) creates a plurality of separate fault families, each fault mode of the first fault family not having any selected present symptoms in common with each fault mode of a second fault family.

17. The method according to claim 2, characterized in that step (c) further comprises:
- (c1) scanning each fault mode listed in the list of fault modes to determine whether the scanned fault mode already belongs to a fault family;
- (c2) if the scanned fault mode does not already belong to a fault family, creating a new fault family comprising the scanned fault mode;
- (c3) scanning all of the selected present symptoms capable of being created by the scanned fault mode of the new fault family;
- (c4) checking off, based on the table of correspondence, other fault modes capable of creating said selected present symptoms;
- (c5) determining, for each other checked fault mode, whether that fault mode belongs to another fault family.

18. The method according to claim 11, characterized in that it comprises, for each subset, the calculation of a probability of the occurrence of each of the fault modes present in the subset as a function of a predetermined occurrence value of each fault mode.

19. A system for analyzing faults present on a platform, comprising:
- a processor for storing a table of correspondence between a plurality of observable symptoms on the platform and fault modes capable of creating each observable symptoms;
- detectors for measuring the observable symptoms present on the platform and selecting at least some of the measured present symptoms;
- a processor for establishing at least one fault family, the processor being configured to:
  - obtain, from the table of correspondence, a list of fault modes capable of creating, alone or in combination, all of the selected present symptoms;
  - place each fault mode of said list in a fault family;
  - group together, in the same fault family as the fault, all of the fault modes from the list capable of creating at least one selected present symptom shared with the fault mode.

\* \* \* \* \*